United States Patent Office 2,759,232
Patented Aug. 21, 1956

2,759,232

PROCESS OF REMOVING WAX, PLASTIC, AND LIKE PATTERN MATERIALS FROM THIN SHELL MOLDS

Geza Demeter, Cranford, N. J., and James C. Johnson and Francis X. Maher, Jr., New York, N. Y., assignors to Arwood Precision Castings Corporation, Brooklyn, N. Y., a corporation of New York No Drawing. Application January 2, 1953, Serial No. 329,464

8 Claims. (Cl. 22—196)

This invention relates to a process for removing wax, plastics and other pattern materials from a mold in the "lost wax" process of preparing molds for casting metal parts. More particularly, it relates to removing pattern materials from a mold formed by dip-coating a pattern made of wax, plastic or other similar or usual pattern materials. It should be understood that when reference is made below to the use, in prior practice, of "wax," that term includes various compositions of wax, plastic materials and the like which are or may have been used in making patterns in the so-called "lost wax" process.

It has long been known that unsupported molds formed by dip-coating wax patterns would crack and break when attempting to melt and remove the wax. The expansion of the wax, as it warmed up relatively slowly and uniformly to the melting point, developed sufficient stress to crack or break the relatively thin investment or mold that is formed by dip-coating. Thus, in prior practice the mold was always supported in a flask or the like by known materials in the usual way to give it strength and support before the wax was removed. Logically, it followed that unsupported dip-coated molds could not be successfully made and used when employing patterns made of wax.

Therefore, it is an object of this invention to provide an improved process for removing wax or other pattern materials from an unsupported dip-coated investment mold.

Another object is to provide a novel process for removing wax or other pattern materials from an unsupported dip-coated investment mold by avoiding expansion of the whole wax body until provision is made for such expansion to occur without creating destructive stresses within the mold with resultant cracking or breakage.

Another object is to provide a step in the process of melting and removing of the wax from an unsupported dip-coated investment mold which will enable the wax to be melted and removed without cracking or damaging the investment.

Another object is to reduce the cost of wax investment molding processes by avoiding the necessity of warming a flask or the like, by reducing or saving the burn-out time, by saving on or avoiding entirely the use of flask materials and by saving labor costs which were heretofore necessary in carrying out those several steps and operations.

Other objects and advantages will become apparent as the invention is described.

According to this invention, the usual process of making a wax pattern from a master die or mold is carried out as heretofore. The master mold is opened and the wax pattern removed after it has hardened.

The wax pattern or impression is then dipped in a slurry, or a series of slurries if the dip-coat is to be built up of more than one coating. The coating is allowed to solidify according to usual procedures. During all the foregoing, usual techniques in the design of the pattern, composition of the slurry or slurries, temperatures and other factors are observed and followed.

After the dip-coated mold has solidified, the whole mold with the wax pattern within it is immersed in hot water at a temperature from just above the melting point of wax to 212° F. but preferably at or about the boiling point. The immersion is continued for about one minute or at least long enough for the wax immediately adjacent the surface of the mold to melt. Then the mold is preferably immediately placed in an oven at a temperature of 200° F. or more and is kept in the oven for as long as is necessary for the wax to melt completely. Because the wax adjacent the mold surface has been made fluid, expansion of the remaining wax as it rises to the melting point causes no pressures which the mold cannot withstand. The molten wax can flow to allow expansion without pressure on the mold. On removal of the mold from the oven the wax may be discharged in any suitable and usual fashion. Although higher oven temperatures or furnace temperatures may be employed, it is practically desirable to save the wax; and hence high temperatures which would result in vaporizing or burning the wax and consequent loss thereof are generally avoided. Although not as convenient, it is possible to remove the molten wax while the mold is still in the oven.

Heating of the wax-filled mold in water is different in its effect and in its action from heating in air or another gaseous medium. The mold is porous to the extent that it absorbs water, allowing the water to penetrate and come into intimate contact with the mold material over a relatively large surface area thus facilitating rapid heating of the mold. The slow heating of the wax-filled mold as heretofore attempted was not only time-consuming but it caused heating which was too uniform. As a result, the wax pattern as a whole could expand substantially, exerting pressure on the mold which finally would crack or break it. Hence the industry resorted to supporting the mold in a flask or otherwise.

The disadvantage of slow-heating was amplified and aggravated by the presence of the backing or supporting material, i. e., the flask and contents in some cases, which added greatly to the mass which had to be heated, and practically insured relatively uniform heating of the wax. The presence of the support could in that instance prevent breakage but at great cost. In contrast to the disadvantages of thick walls, massive molds and flasks, the shell type mold formed by dip-coating, with its small mass and its relatively thin walls, is particularly suited to rapid heating of the whole mold to the melting temperature of the pattern material, before the heat can penetrate and warm the pattern sufficiently to cause serious expansion. As a consequence of the quick heating of the mold, the surface of the pattern against the mold melts before the pattern itself can expand. The molten material flows; and there is no breakage of the mold by expansion of the pattern.

It is preferred to remove the wax-filled mold from the hot bath before the wax has become entirely molten. Although the mold and wax can remain in the water until the wax is entirely melted, it is preferred not to do that because particles of mold material float in the bath and can contaminate the mold cavity.

After removal of the wax, the mold can be heated in a furnace in the usual way to burn out residual particles of wax.

The mold can be used with or without backing or support depending on the metal or alloy that is to be cast.

Although the invention has been described in reference to wax patterns, it should be understood it is applicable to plastic and other pattern materials including mercury which, acting like wax, are capable of softening and flowing adjacent the mold surface before being heated through and to melting temperature.

The hot bath is preferably water because of its cheapness and availability; but other liquids have also been used with satisfactory results even though in some instances their boiling points were near or only slightly above the melting point of the wax. The class of liquids which can be used can be defined generally as those which do not chemically react to any noticeable or appreciable extent with the mold materials at the temperatures employed and which have boiling points above the melting point of the wax or other pattern material. It is naturally preferable also that the bath material not react chemically with the wax in such a way or to such an extent as to alter or contaminate it materially, since the wax or other pattern material could not then be used again. However, in some cases the advantages of one bath material or another might outweigh the loss of the wax.

Other bath materials which can be used satisfactorily are sulphuric, nitric, hydrochloric, phosphoric, acetic and citric acids, either concentrated or diluted; carbon tetrachloride; alcohol; and benzene.

Liquids which react with the mold materials, such as sodium hydroxide, are not usually satisfactory.

The bath material used determines the highest temperature level to which it may be heated before the wax-filled mold is immersed in it. Preferably, the bath is heated to or just below its boiling point for quicker action, but any temperature down to the melting point of the wax may be used, although at the lowest temperatures the action is less satisfactory than at the higher.

The solvent action on the wax of some of the liquids is negligible because of the short period of immersion; and the same is true of their chemical reaction with the wax. Moreover, such chemical reaction as occurs when using acids results in generation of gas particularly in the melting portions of the wax which helps rather than hinders.

The period of immersion may be varied above or below one minute depending on the particular mold form, the composition of the wax and other factors which might influence the melting of the wax while immersed.

From the foregoing, it will be apparent that the process described enables relatively thin shell molds to be made successfully with wax patterns by the dip-coating process, while at the same time reducing to a minimum prolonged heating and burn-out steps. As a result great economies are achieved (a) in labor heretofore needed in making the mold form of mold and handling the no-longer needed mold materials; (b) in flask materials which were wasted and in which capital was tied up; (c) in heating costs which are now sharply reduced due to not having to warm up the flask and contents; (d) in time required for the whole process through reducing in heating and other times.

Many variations of the invention will occur to those skilled in the art. Therefore the invention is not limited precisely to details of the examples described.

What we claim is:

1. The process for removing patterns made of wax, plastic and the like from shell investment molds having thin unsupported walls formed by dip-coating one or more times but not enough times to form a wall sufficiently strong to withstand expansion pressures of the pattern normally created by slow heating comprising immersing the mold containing the pattern in a liquid heated between and including the boiling point of said liquid and at least the melting point of the pattern material, maintaining the mold in said liquid for a period sufficient only to melt enough pattern material directly adjacent the interior mold surface to provide for expansion of the unmelted remainder of the mold material without cracking the mold, removing the mold from the liquid, heating the mold sufficiently to melt all the pattern material, and removing the pattern material.

2. The process of claim 1 employing a liquid which does not chemically react with nor dissolve the mold material materially during the period of immersion.

3. The process for removing patterns made of wax, plastic and the like from shell investment molds having thin unsupported walls formed by dip-coating one or more times but not enough times to form a wall sufficiently strong to withstand expansion pressures of the pattern normally created by slow heating comprising immersing the mold containing the pattern in a liquid heated between and including the boiling point of said liquid and at least the melting point of the pattern material, maintaining the mold in said liquid for a period only sufficient to melt enough pattern material directly adjacent the interior surface of the mold to provide for expansion of the unmelted remainder of the mold material without cracking the mold, removing the mold from the liquid and removing the pattern material thereafter.

4. The process for removing patterns made of wax, plastic and the like from shell investment molds having thin unsupported walls formed by dip-coating one or more times but not enough times to form a wall sufficiently strong to withstand expansion pressures of the pattern normally created by slow heating comprising immersing the mold containing the pattern in a liquid heated between and including the boiling point of said liquid and at least the melting point of the pattern material, maintaining the mold in said liquid for about one minute and to cause the pattern material immediately adjacent the interior surface of the mold to melt enough to provide for expansion of the unmelted remainder of the pattern material without cracking the mold, removing the mold from the liquid, and removing the pattern material thereafter.

5. The process for removing patterns made of wax, plastic and the like from shell investment molds having thin unsupported walls formed by dip-coating one or more times but not enough times to form a wall sufficiently strong to withstand expansion pressures of the pattern normally created by slow heating comprising immersing the mold containing the pattern in a liquid heated between and including the boiling point of said liquid and at least the melting point of the pattern material, maintaining the mold in said liquid for about one minute and to cause the pattern material immediately adjacent the interior surface of the mold to melt enough to provide for expansion of the unmelted remainder of the pattern material without cracking the mold, removing the mold from the liquid and heating it for a sufficient period to melt all the pattern material, and then removing the pattern material.

6. The process for removing patterns made of wax, plastic and the like from shell investment molds having thin unsupported walls formed by dip-coating one or more times but not enough times to form a wall sufficiently strong to withstand expansion pressures of the pattern normally created by slow heating, said molds being made of conventional porous mold materials comprising immersing the mold containing the pattern in a liquid which is capable of penetrating into the mold, said liquid being heated between and including its boiling point and at least the melting point of the pattern material, maintaining the mold in the liquid for a period only sufficient to melt the pattern material directly adjacent the interior surface of the mold, removing the mold from the liquid, and then removing the pattern material from the mold.

7. The process claimed in claim 6 including the step of heating the mold to melt all the pattern material, and then removing the pattern material from the mold.

8. The process claimed in claim 7 employing a liquid which does not chemically react with nor dissolve the mold material materially during the period of immersion.

References Cited in the file of this patent

UNITED STATES PATENTS

| | | |
|---|---|---|
| 1,013,666 | Lederle | Jan. 2, 1912 |
| 2,388,299 | Thielemann | Nov. 6, 1945 |
| 2,401,760 | Heyroth | June 11, 1946 |
| 2,463,193 | McFadden | Mar. 1, 1949 |
| 2,480,048 | Rice | Aug. 23, 1949 |

FOREIGN PATENTS

| | | |
|---|---|---|
| 334,963 | Great Britain | Sept. 9, 1930 |